United States Patent
Bouchee (10) Patent No.: US 7,200,777 B1
(45) Date of Patent: Apr. 3, 2007

(54) AUDIT TRAIL LOGGING AND RECOVERY USING MULTIPLE AUDIT FILES

(75) Inventor: Dick G. Bouchee, Vadnais Heights, MN (US)

(73) Assignee: Unisys Corporation, Blue Bell, PA (US)

(*) Notice: Subject to any disclaimer, the term of this patent is extended or adjusted under 35 U.S.C. 154(b) by 569 days.

(21) Appl. No.: 10/330,997

(22) Filed: Dec. 27, 2002

(51) Int. Cl.
G06F 11/00 (2006.01)

(52) U.S. Cl. ....................................... 714/45

(58) Field of Classification Search ............. 714/15, 714/16, 2, 6, 20
See application file for complete search history.

(56) References Cited

U.S. PATENT DOCUMENTS

| | | | | |
|---|---|---|---|---|
| 6,079,000 A * | 6/2000 | Cooper et al. | | 711/162 |
| 6,085,200 A * | 7/2000 | Hill et al. | | 707/202 |
| 6,324,548 B1 * | 11/2001 | Sorenson | | 707/204 |
| 6,408,310 B1 * | 6/2002 | Hart | | 707/201 |
| 6,539,402 B1 * | 3/2003 | Sorenson et al. | | 711/162 |
| 6,701,456 B1 * | 3/2004 | Biessener | | 714/20 |

* cited by examiner

Primary Examiner—Scott Baderman
Assistant Examiner—Brian Assessor
(74) Attorney, Agent, or Firm—Charles A. Johnson; Mark T. Starr; Shumaker & Sieffert, P.A.

(57) ABSTRACT

Techniques are described that utilize multiple audit files for a common audit trail for data logging and recovery within a computing system. For example, an audit control module maintains a queue of file identifiers for audit files associated with the audit trail. The audit control module selects file identifiers from the queue, and stores audit blocks within the audit files based on the selected file identifiers. In this manner, the audit control module may store non-duplicate portions of the audit trail data within different audit files associated with the audit trail. By making use of multiple audit files for a single audit trail, the transfer of an audit block to the audit trail need not be delayed until the completion of a previous data transfer to the audit trail.

37 Claims, 6 Drawing Sheets

AUDIT TRAIL LOGGING AND RECOVERY USING MULTIPLE AUDIT FILES

TECHNICAL FIELD

The invention relates to computer systems and, more particularly, techniques for event logging and recovery from system failures.

BACKGROUND

In general, computer systems are subject to hardware and software malfunctions, power outages, and other unforeseen failures that may lead to data loss or corruption. As a result, numerous recovery techniques have been devised to reduce the impact of such a failure. Often, these techniques allow a computer system to reconstruct or otherwise recover much of the data after the failure. These techniques may be employed in a variety of applications and environments, such as financial, inventory management, point-of-sale, and travel reservation systems.

One common data recovery and restoration technique is an audit trail. In general, an audit trail is a mechanism that records sequential, time-related system event records in an associated audit trail file. For example, a database may utilize an associated audit trail to record changes to the database. As another example, an audit trail may be used to record sequential, time-dependent performance or event records within a transaction-processing environment. As another example, a common sequential audit trail is a system log audit trail that captures all computer access events in time order.

The audit trail files may be accessed for a variety of reasons. For example, in the event of database or system failure, a database can be re-constructed from the audit trail. As another example, the audit trail file may be accessed to generate report detailing user access or program error information.

Often, the audit trail is stored within a respective audit file that resides on a magnetic tape or disc drive storage medium. The audit file typically takes the form of sequential audit blocks. More specifically, for a given audit trail, audit trail data may be accumulated in a temporary storage location to form a single audit block. Upon buffering enough audit trail data, the audit block is written to the audit file in one transfer, rather than the many transfers that would otherwise have been required to write each individual record. The audit blocks are sequentially written to the audit file, and include timestamps and trail block sequence numbers (TBSNs) that indicate the order in which the events occurred.

If the computer system fails, a recovery utility may retrieve the audit blocks from the audit file and invoke one of a variety of recovery mechanisms. For example, the recovery utility may "replay" one or more of the recorded changes to restore the system to the state prior to the failure. Alternatively, the recovery utility may utilize the audit blocks to rollback the data to a previous state.

One challenge that arises when using an audit trail is the potential inefficiency of writing audit trail data for each transaction. In particular, inefficiencies may arise due to the time required to write each block. Each transfer of an audit block to the audit trail requires time for accessing the storage medium containing the respective audit file, as well as time for actually writing the audit trail data. This cumulative time may represent an overall significant impact in system response to end users in a high-volume transaction processing environment, e.g., a transaction processing computing system.

SUMMARY

In general, the invention is directed to techniques that utilize multiple audit files for a common audit trail. Multiple audit files are assigned to an audit trail, and audit blocks for the trail are written within the audit files. As one example, variable sized audit data blocks may be sequentially striped among audit files. The audit records may be buffered to form an audit block, and the audit block may be written to any of the audit files associated with the audit trail. In this manner, non-duplicate portions of the audit trail data may be stored within different audit files associated with the audit trail.

In one embodiment of the invention, a computer system comprises an operating system to generate audit trail data for a sequential audit trail, and an audit control module to receive the audit trail data from the operating system and store non-duplicate portions of the audit trail data within different audit files associated with the audit trail.

In another embodiment of the invention, a method comprises receiving one or more requests to store audit trail data, and storing portions of the audit trail data within different audit files associated with a sequential audit trail.

In another embodiment of the invention, a method comprises maintaining a queue of file identifiers for audit files associated with a common audit trail. The method further comprises receiving a request to store a first block of audit trail data, selecting a first file identifier from the queue, and initiating a write to store the first block of audit trail data to the respective audit file for the first file identifier. The method further comprises receiving a request to store a second block of audit trail data, selecting a second file identifier from the queue, and initiating a write to store the second block of audit trail data to the respective audit file for the second file identifier prior to completion of the write of the first block.

In another embodiment of the invention, a computing device comprises means for generating audit trail data for a sequential audit trail, and means for storing non-duplicate portions of the audit trail data within different audit files associated with the audit trail.

The invention may provide one or more advantages. In general, the techniques may improve performance of the computing system. For example, since multiple audit files may be used to collectively store audit trail data for an audit trail, multiple audit blocks may be written to the audit trail in parallel. Consequently, the audit blocks need not be written synchronously, as with conventional systems. In other words, the transfer of an audit block to the audit trail need not be delayed until the completion of a previous data transfer to the audit trail.

In addition, the audit control module may provide for the automatic duplication of the audit trail data to further increase reliability. The audit control module may store the duplicate audit trail data within a second set of audit files, i.e., a backup "leg" associated with the audit trail. Moreover, the audit control module may support mixed-media in that the sets of audit files may be stored on different types of storage media, e.g., tape media and mass storage media. For example, the original audit trail data may be stored within audit files on a disc-based storage medium, and the duplicate audit trail data may be stored within audit files within a tape-based storage medium.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
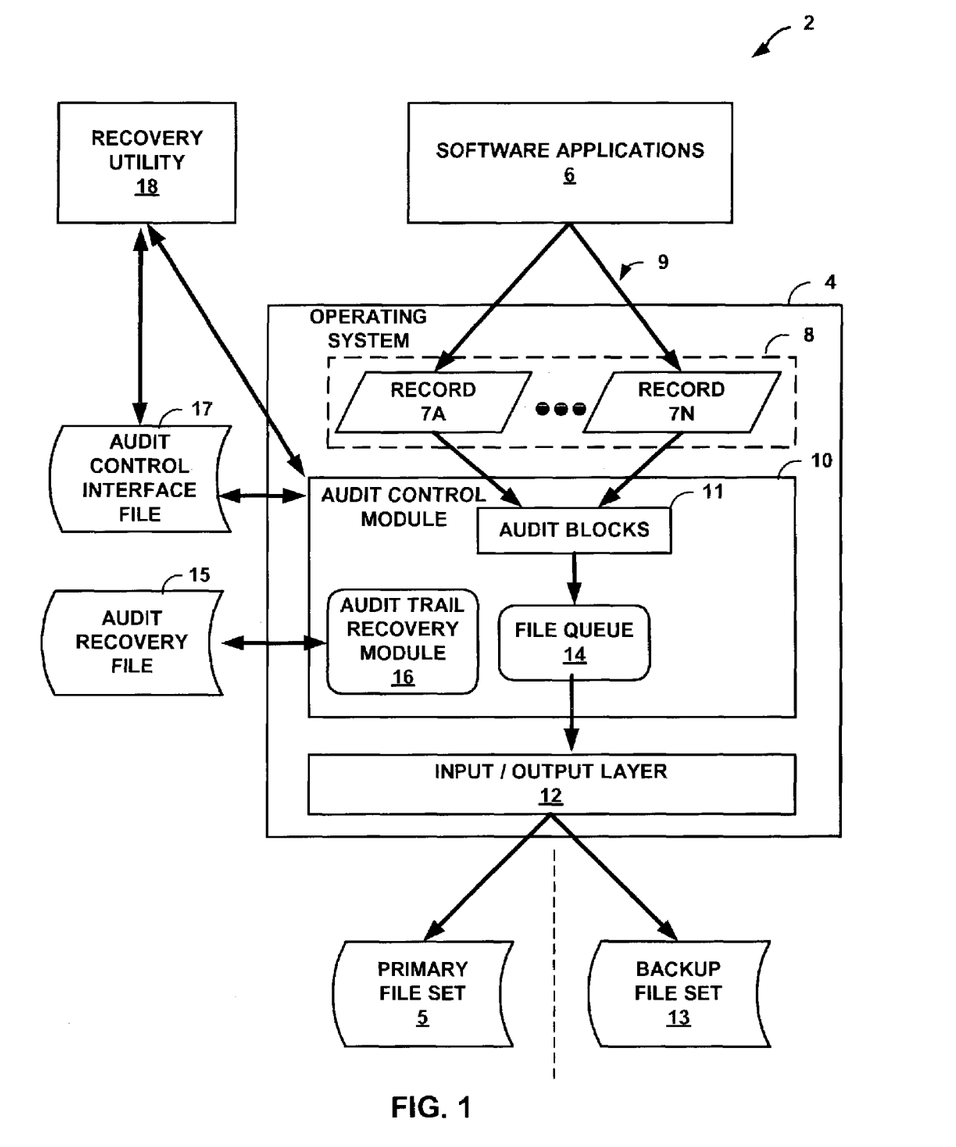
FIG. 1 is a block diagram illustrating an example computing system in which an operating system utilizes multiple audit files for maintaining an audit trail.

FIG. 1 is a block diagram illustrating an example computing system 2 in which an operating system 4 may utilize multiple audit files 5,13 for a sequential audit trail. As described herein, operating system 4 generates audit trail data 8 in response to one or more events 9 that, for example, may be received from software applications 6. Operating system 4 invokes an audit control module 10 to store audit trail data 8 among a first (primary) set of audit files 5, and optionally among a second (backup) set of audit files 13. The term "event" is used to generally refer to any change, action or occurrence within computing system 2 that causes operating system 4 to generate audit trail data 8. For example, an event 9 may be received from software applications 6 (as illustrated), or may be internal to operating system 4. As examples, an event may be a command to modify a database, perform an input/output (I/O) operation, or launch or terminate a software application 6. Other example events include the removal of a storage medium, detection of a virus, receipt of a network communication, a logon attempt by a user, and the like.

Operating system 4 generates audit trail data 8 in the form of one or more audit records 7A–7N that contain event information, e.g., transaction information. Audit control module 10 receives audit records 7 via one or more requests, and buffers the records to form one or more audit blocks 11. Specifically, audit control module 10 buffers audit records 7 to form one of audit blocks 11, and stores the audit block upon buffering a maximum amount of audit trail data 8, receipt of a trigger, expiration of a timer, or similar mechanism.

To aid in determining an order in which events 9 occurred, audit control module 10 may include sequence information within audit blocks 1. The sequence information may, for example, include a block number, a timestamp, and a trail block sequence number (TBSN). More specifically, each of audit blocks 11 may include a timestamp reflecting the time the block was prepared for I/O, a block number that is unique to the file 5 to which the block is written, and a TBSN that is unique to the audit trail. In this manner, the "sequential" nature of the events is persevered within the audit trail even though multiple files may be used.

Upon forming an audit block 11, audit control module 10 selects one of files 5 to store the audit block. In one embodiment, audit control module 10 maintains a queue 14 to hold file identifiers (file ids), e.g., filenames and paths, for audit files 5. Audit control module 10 selects file ids from queue 14 for audit files 5 available for sequential input/output (I/O), and stores newly created audit blocks 11 within the selected audit files. Audit control module 10 writes the audit blocks 11 to the selected audit files 5 via I/O layer 12, which may include software, firmware, hardware, or combinations thereof.

Upon successful completion of writing a data block, audit control module 10 returns the selected file id to queue 14 for re-use. Audit control module 10 may, for example, return the file id to the top or the bottom of queue 14. Returning the file id to the top of queue 14 may achieve the benefit of reducing the number of files to which audit blocks 11 are written. Additionally, returning the file id to the top of queue 14 may provide increased performance. In particular, file ids associated with higher-performance storage devices migrate to the top of queue 14 over time, causing these devices to be used more frequently than lower performance devices. Returning the file ids to the bottom of queue 14, however, may result in a more even distribution of audit blocks 11 to files 5. Although described in reference to a single queue, multiple queues may readily be used. Moreover, other data structures may be used to store file ids, such as arrays, linked lists, and the like.

Audit control module 10 generates and stores each newly formed audit control block 11 in similar fashion. In this manner, audit control module 10 may store non-duplicate portions of audit trail data 8, e.g., different audit blocks 11, within different audit files 5 for the audit trail. In general, audit control module 10 may utilize these techniques to improve performance of computing system 2. For example, audit control module 10 may initiate the parallel writing of multiple audit blocks 11 to files 5. In other words, audit control module 10 need not synchronously write audit blocks 11, i.e., wait for completion of a first block write prior to initiating a second block write, as with conventional systems. As a result, the transfer of an audit block 11 to one of audit files 5 need not be delayed until the completion of a previous data transfer to the same file, as is common with conventional systems. Instead, in some cases, audit blocks 11 can be written simultaneously, or at least asynchronously. As a result, any performance impact on software applications 6 may be reduced or minimized by utilizing multiple audit files 5.

Additionally, when available within queue 14, audit control module 10 may select multiple file ids during a single access of queue 14. In particular, audit control module 10 may select a first file id for the current audit block 11 being written, and may pre-select a file id for the next audit block to be written. This technique allows audit control module 10 to record the file id for the next time-sequential block as part of the current audit block 11. This provides a forward pointer, i.e., a link, to aid accessing the sequential audit trail when needed. In other words, a software program, e.g., recovery utility 18, can read an audit block from an audit file 5, and easily identify the audit file containing the next audit block 11 associated with the sequential audit trail.

While storing audit trail data 8, audit control module 10 may provide for the automatic duplication of the audit trail data to further increase reliability of computer system 2. For any given audit trail, audit control module 10 may automatically generate and store duplicate audit trail data, also referred to herein as a backup "leg" for the audit trail. In this fashion, a single audit trail may be viewed as having one or more "legs," e.g., a primary leg and a backup leg. Audit control module 10 may store duplicate audit trail data within the audit files 5 associated with the audit trail, i.e., the same audit files used to stored audit data 8. Alternatively, audit control module 10 may utilize a second (backup) set of audit files 13 associated with the audit trail. In other words, audit control module 10 may write audit data 8 to audit files 5, and the duplicate audit data to audit files 13 associated with the same audit trail.

Audit control module 10 may be configured to support mixed-media in that each set of audit files 5 for the legs may be stored on different types of storage media, e.g., a tape media and a mass storage media. For example, audit control module 10 may store audit trail data 8 within files on a disc-based storage medium, and possibly a removable storage medium, and may store duplicate audit data within audit files on a tape-based storage medium. Advantageously, the utilization of mixed media can provide for automatic data archive to tape media. Moreover, the number of files configured for use with each leg may be different. For example, a reduced number of files may be defined for tape media. This may have the benefit of reducing the number of tape files to service, and may provide a tape performance benefit by allowing a tape device to remain in streaming mode for longer periods.

To aid in audit trail recovery, audit control module 10 maintains an audit recovery file 15 and an audit control interface (ACI) file 17. More specifically, audit control module 10 maintains ACI file 17 to contain usage information for audit data files 5. For example, audit control module 10 may store a variety of usage information within ACI file 17, such as file ids for files 5,13, data indicating the types of media used for storing the files, start and end times for the audit trail, general audit trail statistics, and the like, written in time-sequence order.

In addition, audit control module 10 maintains information in audit recovery file 15 to record a recovery status for each of audit files 5, 13. For example, audit recovery file 15 records information identifying the files to re-assign, media type, and a recovery address for mass storage files 5,13 so that in the event of a system outage, e.g., power failure, audit trail recovery module 16 can be invoked to recover the audit trail files. During normal audit trail operation, audit control module 10 periodically updates audit recovery file 15, e.g., every minute, with a current recovery address of the last audit block 11 written to each audit file 5. To further aid recovery, audit control module 10 includes within each audit block 11 a specially formatted sentinel record that is "appended" to the end of each audit block. This sentinel record is written over by the next audit block written and, as a result, indicates the last valid audit block written to each of files 5, 13.

During recovery, audit trail recovery module 16 "re-assigns" all audit files 5, i.e., ensures that all files 5 are accessible. For example, audit control module 10 may oversee preparation of on or more storage media to ensure the necessary files 5, 13 are accessible for recovery. In particular, the recovery address is used to read forward on each mass storage file until the sentinel block is found indicating end of valid data. Tape files are typically not dismounted during a system outage, and are therefore already positioned at the end of the last block written. Tape files are re-assigned by audit recovery module 16. Each tape file is moved back a single block, and a single block read can be used to recover the last block written to each tape file.

Once all audit files have positioned at their respective end of data point, the files are "re-sequenced." In particular, audit trail recovery module 16 may need to re-sequence the data blocks to ensure the integrity of the sequential audit data stored within files 5, 13 for the audit trail. For example, before the system failure, I/O layer 12 may have initiated multiple data block writes to files 5, 13. However, not all of the data blocks may have been written prior to the system failure. Moreover, because the block writes were issued asynchronously, they may not have completed in the order in which they were issued. As a result, files 5, 13 may store non-sequential audit blocks, and may need to be re-sequenced to restore the sequential nature of the audit trail.

To re-sequence files 5, 13, recovery module 16 reads files 5, 13 to locate the last valid data block written therein. For example, audit trail recovery module 16 may identify a highest of the sequential TBSNs for audit blocks 11 successfully stored within the respective audit files. During this process, recovery module 16 may determine that a block with, for example, TBSN X is not present within any file, but a block having a greater TBSN, e.g., TBSN X+1, is present. In this instance, the integrity of the audit trail has been compromised, and the files 5, 13, or both, must be re-sequenced.

This may easily be accomplished under certain circumstances when the missing block or blocks, e.g., the TBSN X block, can be recovered from memory. In some situations, for example, audit blocks 11 buffered within operating system 4 may be recovered upon rebooting the computing system 2. In other circumstances, a duplicate of TBSN block X+1 may be present in one of backup files 13, which can be used re-sequencing files 5. In this circumstance, TBSN block X can be retrieved from one of files 13, and written to one of files 5.

Based on the recoverability of the audit trail, i.e., the "trail recovery status," recovery utility 18 may access the audit control interface file 17, to invoke one of a variety of recovery mechanisms to restore the software application data to a consistent state. For example, records may be discarded from applications 6 in a roll back technique, or may be applied, i.e., rolled forward, to complete an in-progress action to the application 6. Once recovery modules 16 and 18 have completed their respective operations, and associated application 6 files are consistent, audit control module 10 continues buffering and recording new audit data 8.

Figure 2:
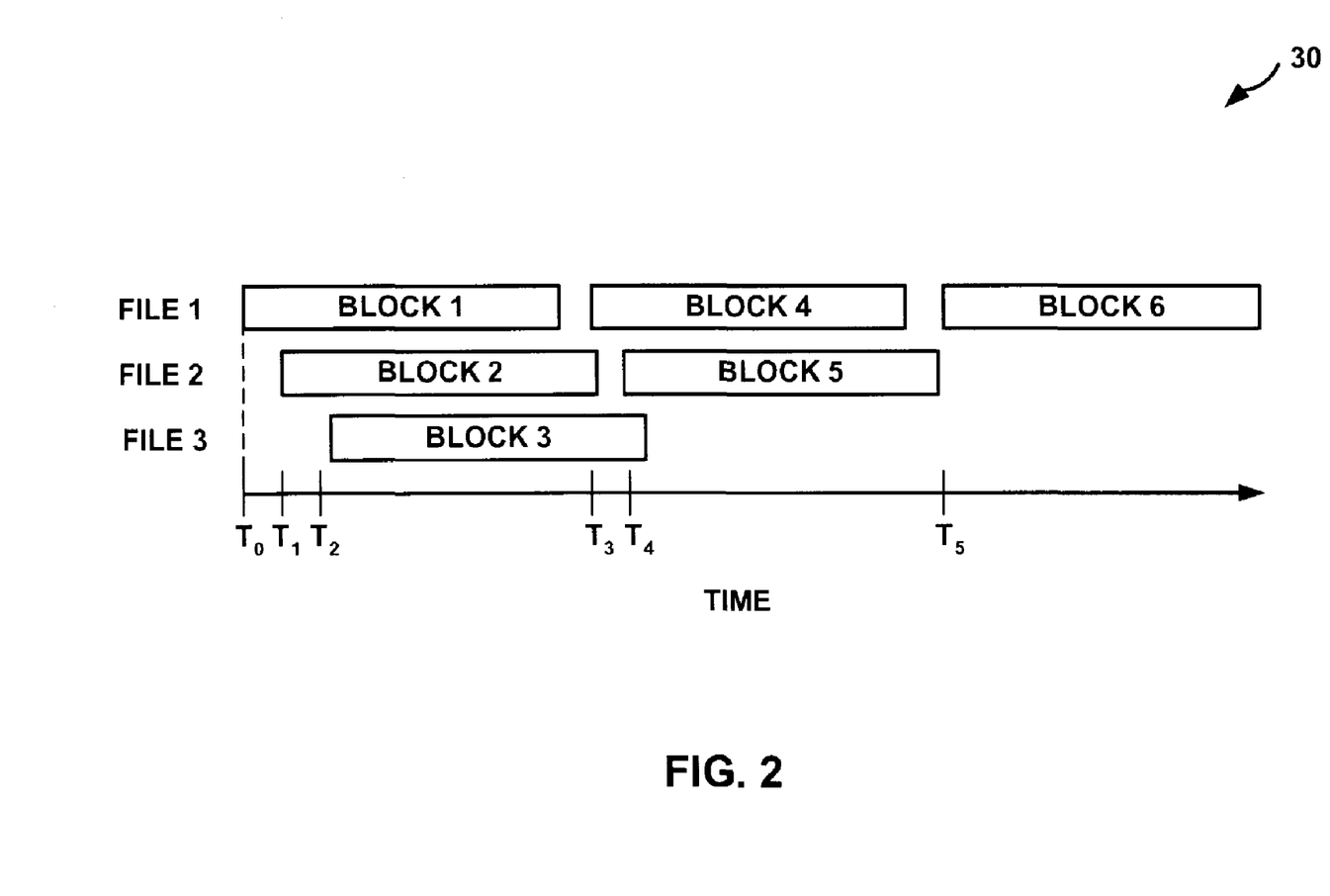
FIG. 2 is a timing diagram illustrating an example distribution of audit blocks to three audit files associated with a common audit trail.

FIG. 2 is a timing diagram 30 illustrating an example distribution of audit blocks 11 to three audit files 5 associated with a common audit trail. In the example distribution, audit control module 10 selects a first file identifier from queue 14, and initiates a write of a first one of audit blocks 11 (BLOCK 1) to a first file (FILE 1) at a time T0. In a similar manner, audit control module 10 subsequently initiates a write of a second audit block (BLOCK 2) to a second file (FILE 2) at a time T1, and a write of a third audit block (BLOCK 3) to a third file (FILE 3) at a time T2.

Notably, audit control module 10 initiates the writes in parallel, i.e., prior to completing the write of the previous audit blocks. For example, audit control module 10 initiates the write of BLOCK 2 prior to completing the write of BLOCK 1. Similarly, audit control module 10 initiates the write of BLOCK 3 prior to completing the write of BLOCK 2. The time delay between the first write and the second write, i.e., the time difference between T0 and T1, is a result of audit control module 10 buffering audit trail data 8 to form another audit block 11, i.e., BLOCK 2. The time delay between the second write and the third write is a result of audit control module 10 buffering audit trail data 8 to form BLOCK 3. Accordingly, these time delays do not necessarily represent any performance degradation.

Upon forming a forth audit block (BLOCK 4), audit control module 10 selects another file identifier from the queue 14. In this example, only three audit files 5 are associated with the audit trail. Consequently, audit control module 10 writes BLOCK 4 to one of the three files, e.g., FILE 1. In particular, audit control module 10 writes BLOCK 4 to any one of the audit files 5 that is currently available, i.e., finished with a prior block write. Upon completion of a block write to a file 5, the associated file id is returned to queue 14 for reuse.

In this example, audit control module 10 writes BLOCK 4 to FILE 1 at time T3. Similarly, audit control module 10 writes BLOCK 5 to FILE 2 at time T4, and BLOCK 6 to FILE 1 at time T5.

Figure 3:
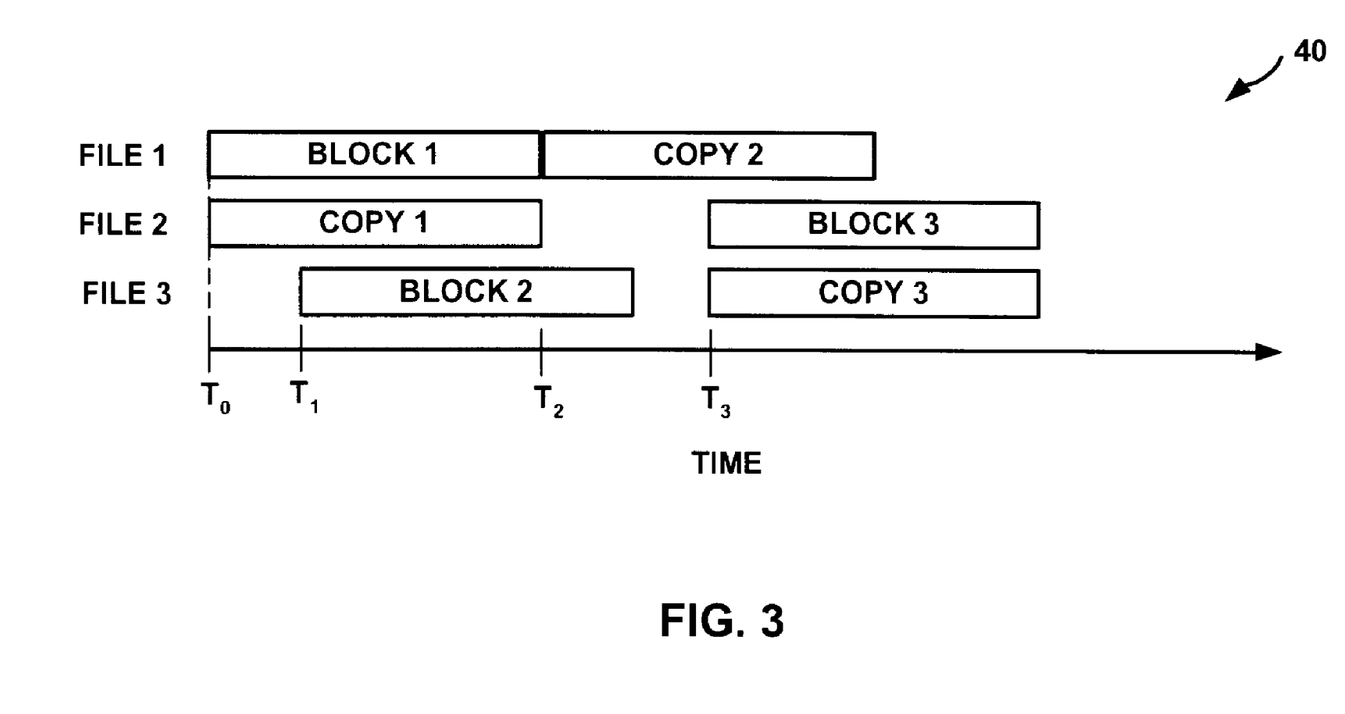
FIG. 3 is another timing diagram illustrating an example distribution of audit blocks and duplicate data to a single set of audit files, i.e., a single "leg," of an audit trail.

FIG. 3 is another timing diagram 40 illustrating an example distribution of audit blocks 11 and duplicate data in a single set of audit files, e.g., FILES 1–3. Initially, audit control module 10 initiates a write of a first one of audit blocks 111 (BLOCK 1) to a first file (FILE 1) and a write of a copy of the block (COPY 1) to a second file (FILE 2) at a time T0.

Next, audit control module 10 initiates a write of a second audit block (BLOCK 2) to a third file (FILE 3) at a time T1. As none of the prior writes have finished at time T1, as illustrated by the example, audit control module 10 waits until a time T2 to initiate a write of a duplication of the block (COPY 2) to FILE 1.

Similarly, audit control module 10 initiates a write of a third audit block (BLOCK 3) and a duplicate (COPY 3) at a time T3. In particular, as both FILE 2 and FILE 3 are available, audit control module 10 can immediately initiate both writes.

Figure 4:
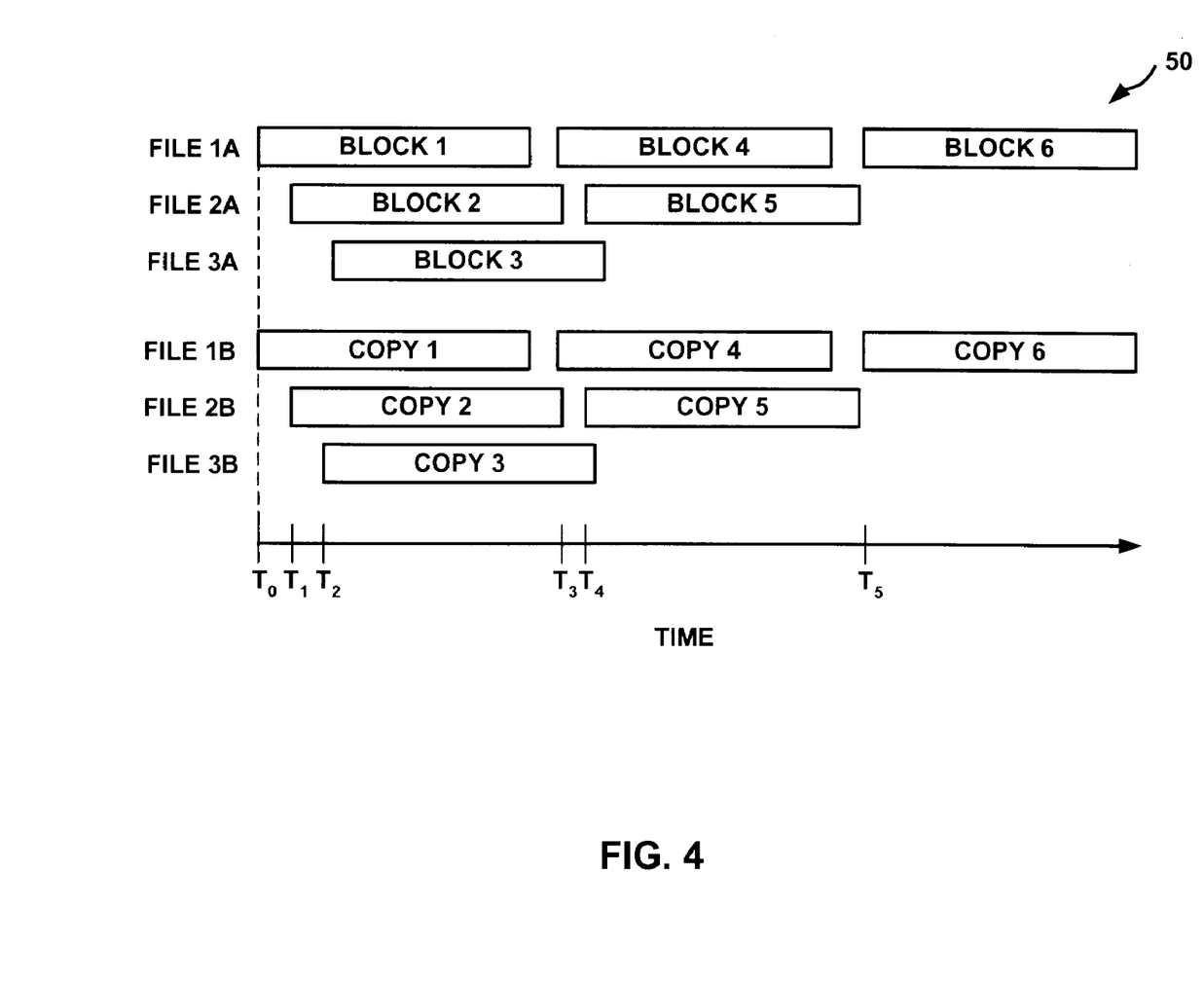
FIG. 4 is another timing diagram illustrating an example distribution of audit blocks and duplicate data to two separate sets of audit files, i.e., separate legs, of an audit trail

FIG. 4 is another timing diagram 50 that illustrates an example storage of data blocks 11 and duplicate data in different sets of files, e.g., primary audit files 5 and backup audit files 13, associated with the audit trail. In particular, audit control module 10 stores audit blocks 11 in FILES 1A–3A, and stores duplicate data in FILES 1B–3B.

In general, the method illustrated in FIG. 3 writes a block to one file of file set 5, and writes a copy block to any other file in the file set. In contrast, the method illustrated in FIG. 4 writes a block to a file in file set 5, and writes a copy of the block to a file in backup file set 13. The first method may offer the advantage of requiring fewer files to generally provide similar performance to the second method. However, the first method cannot tolerate the loss of any two files. In other words, recovery may not be possible in the event two files are corrupted or otherwise inaccessible.

The second method, i.e., the method illustrated in FIG. 4, however, can tolerate the loss of a complete file set. Additionally, the second method may provide for physical separation of the file sets. More particularly, the files in one set may be managed to be physically separate from the other file set. In other words, audit control module 10 may require or otherwise enforce a rule that storage media for files 5, 13 be associated with locations that are physically separate. For example, the two files sets may be physically located in separate buildings of an enterprise. As a result, the second method reduces any risk of a catastrophic loss of data, e.g., due to flood, fire, explosion, and the like. Audit control module 10 may incorporate either method to manage duplicate data.

Audit control module 10 may allow a system administrator to configure the number of files assigned to each leg of the audit trail, and whether a separate set of files is used for any duplicate data generated for the audit trail. Increasing the number of audit files 5 tends to reduce the likelihood of delays while recording audit blocks 11. However, this potential benefit may be offset by the increased complexity of file management. Audit control module 10 may maintain counters related to files 5 and buffering utilization. This information may be available to a system operator, and may be written to audit control interface file 17 for later reference. A system administrator may analyze this data to readily determine the number of files 5, and buffer sizes necessary to provide the desired performance using the least number of files and buffer space.

Figure 5:
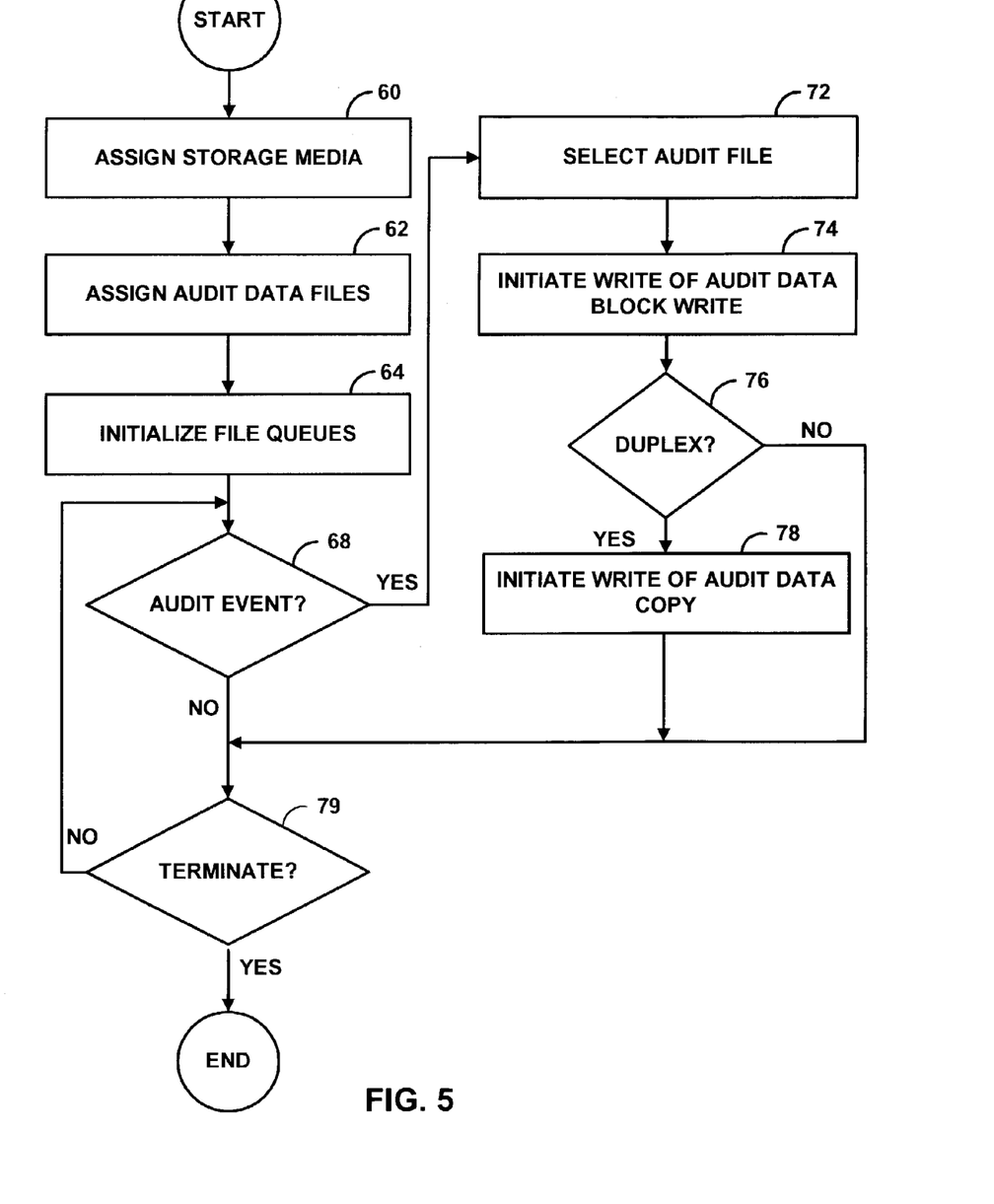
FIG. 5 is a flowchart illustrating example operation of an audit control module.

FIG. 5 is a flowchart illustrating example operation of audit control module 10. Initially, audit control module 10 selects storage media for leg of the audit trail, possibly based on configurable settings received from a system administrator (60). For example, a system administrator may select a first type of media for one audit file, and a second type of media for a second audit file. Further, the system administrator may assign different media for storing original audit blocks 11 and duplicate data to further increase reliability of computing system 2.

Next, audit control module 10 assigns the number of audit data files 5 for each leg of the audit trail (62). As described above, audit control module 10 may assign the number of files to each leg based on configurable settings, past performance statistics, or both. Audit control module 10 initializes queue 14 to store file ids for the assigned files (64). The file ids may, for example, uniquely identify the file and the respective storage storing the file.

Upon receiving sufficient audit event (68) to form an audit block 1, audit control module 10 selects a file id from file queues 14 (72), and initiates a write of the audit data block to the selected file (74). If the audit trail is configured as duplex (76), i.e., for automatic generation and storage of duplicate audit trail data, audit control module 10 initiates a write of a copy of the audit block (78). Audit control module 10 may terminate the audit process for a variety of reasons (79), such as receiving a termination request from the system administrator.

Figure 6:
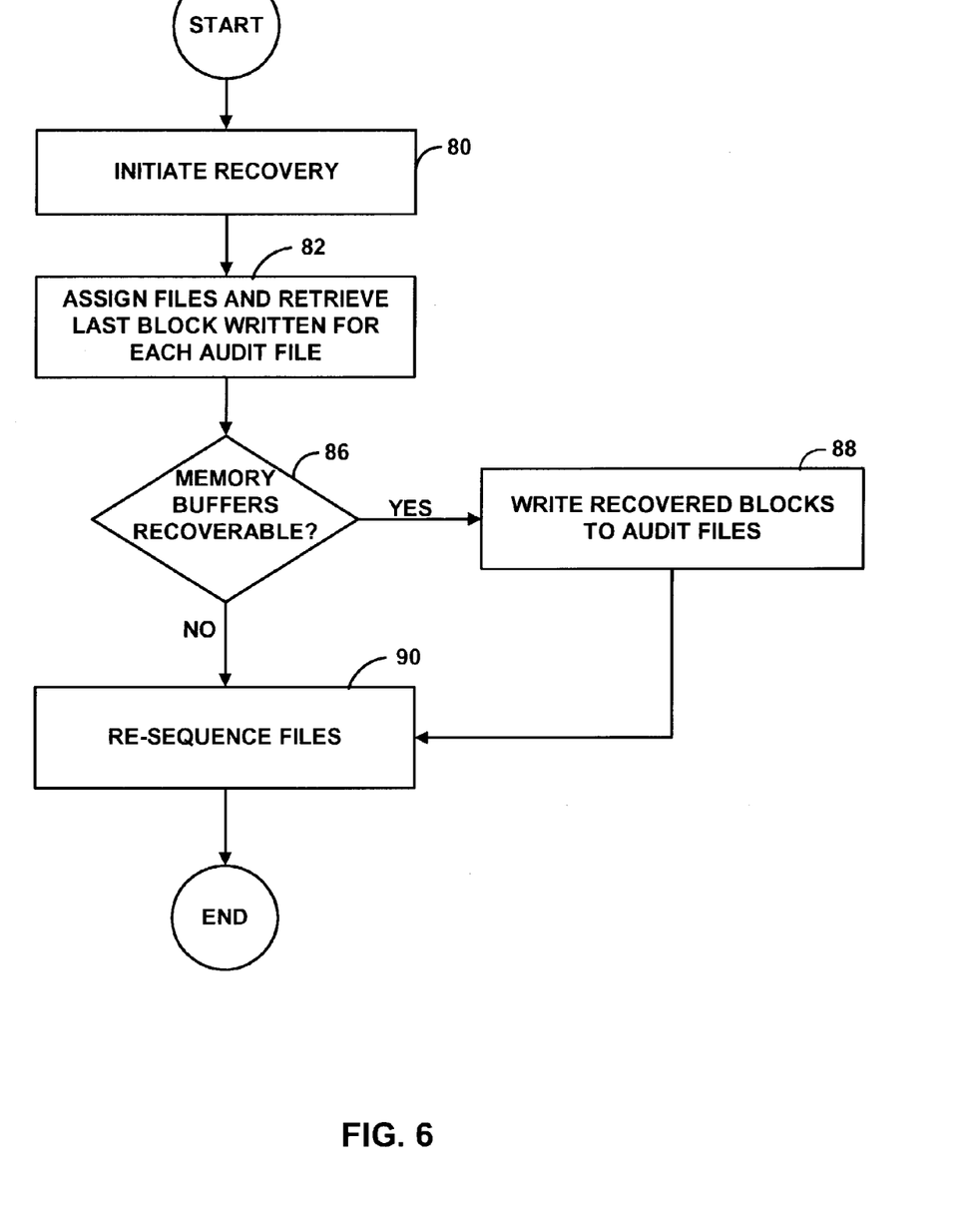
FIG. 6 is a block diagram illustrating operation of a recovery utility while recovering from a failure condition.

FIG. 6 is a block diagram illustrating operation of computing system 2 while recovering from a failure condition. After a failure, audit trail recovery module 16 initiates a recovery process (80) based on the contents of the audit recovery file 15 to assign and access audit data files 5 and read the last valid data blocks written within each of the audit files 5 (82). During this process, recovery module 16 identifies a highest consecutive trail block sequence number (TBSN) that was successfully stored within each of the audit files 5.

Next, if memory buffers can be recovered (86), audit trail recovery module 16 writes any blocks which could have been or were submitted for I/O, and that had not completed at the time of the system outage (88). For example, if a block having TBSN N+1 is recoverable from memory, then audit control module 10 may retrieve the block and store the block to audit files 5 without removing block TBSN N+2.

Recovery module 16 then re-sequences the audit trail to the point of failure (90). In particular, recovery module 16 may remove, e.g., overwrite, any of stored audit blocks 11 that have TBSNs that exceed the identified TBSN. In other words, recovery module 16 may remove from the audit files one or more audit blocks 11 having higher TBSNs in the event an audit block 11 having a lower TBSN was not successfully written prior to the failure. For example, if audit data blocks having TBSNs of 1 through N and N+2 were successfully written to the audit files prior to a system failure, the "point of failure" for the audit trail is the block having TBSN N+1. Consequently, recovery module 16 removes the block having TBSN of N+2 from the audit files to resynchronize them to the point of failure. After the audit files 5 are synchronized, recovery utility 18 may send one or more requests to software applications 6 to apply (roll forward) or discard (roll back) data to ensure applications 6 are restored to a consistent state. Finally, recovery utility 18 notifies audit control module 10 to resume auditing 8 within the audit trail.

Various implementations and embodiments of the invention have been described. Nevertheless, it is understood that various modifications can be made without departing from the invention. Accordingly, these and other embodiments are within the scope of the following claims.

The invention claimed is:

1. A method comprising:
  receiving one or more requests to store audit trail data;
  storing portions of the audit trail data within a plurality of different audit files associated with a sequential audit trail;
  generating duplicate audit trail data from the stored audit trail data; and
  storing the duplicate audit trail data within the same plurality of different audit files within which the stored audit trail data is stored.

2. The method of claim 1, and further comprising:
  selecting one or more file identifiers from a queue of file identifiers for the plurality of different audit files associated with the sequential audit trail,
  wherein storing portions of the audit trail data within the plurality of different audit files comprises storing portions of the audit trail data within the plurality of different audit files associated with the selected file identifiers.

3. The method of claim 1, wherein receiving one or more requests comprises receiving at least two blocks of the audit trail data, and storing portions of the audit trail data comprises writing the blocks to different audit files.

4. The method of claim 3, further comprising:
  writing a first one of the blocks to a first one of the audit files; and
  writing a second one of the blocks to a second one of the audit files.

5. The method of claim 3, further comprising including sequence information within the blocks to indicate a time-sequential order for the blocks.

6. The method of claim 5, wherein including sequence information comprises including within each block a block number that is unique to the file in which the block is stored, a timestamp, and a trail block sequence number (TBSN) that is unique to the audit trail.

7. The method of claim 5, further comprising including a file identifier within each of the blocks to indicate which of the files stores a subsequent one of the blocks based on the order.

8. The method of claim 1, further comprising storing at least two of the audit files on different types of storage media.

9. The method of claim 1, further comprising:
  initiating a recovery process to identify any of the portions of the audit trail data that were unsuccessfully stored within the audit files and that remain within an accessible memory; and
  storing the identified portions of the audit trail data to the audit files.

10. The method of claim 1, further comprising:
  initiating a recovery process to read audit blocks from the audit files, wherein the audit blocks include trail block sequence numbers (TBSNs);
  identifying a highest TBSN of a continuous sequence of TBSNs for the audit blocks stored within the audit files; and
  synchronizing the audit files based on the identified TBSN.

11. A method comprising:
  receiving one or more requests to store audit trail data;
  storing portions of the audit trail data within different audit files associated with a sequential audit trail;
  initiating a recovery process to read audit blocks from the audit files, wherein the audit blocks include trail block sequence numbers (TBSNs);
  identifying a highest TBSN of a continuous sequence of TBSNs for the audit blocks stored within the audit files; and
  synchronizing the audit files based on the identified TBSN,
  wherein synchronizing the audit files includes removing any of the data blocks from the audit files that have TBSNs that exceed the identified TBSN.

12. The method of claim 11, wherein the audit files comprises a first set of audit files, the method further comprising:
  generating duplicate audit trail data from the stored portions of the audit trail data; and
  storing the duplicate audit trail data within a second set of audit files associated with the audit trail.

13. The method of claim 12, further comprising:
  storing the first and second sets of the audit files on different respective storage media; and
  enforcing via computer-executed software that the respective storage media reside at physically separate locations within an enterprise.

14. The method of claim 12, further comprising storing the first set of audit files and the second set of audit files on different types of storage media.

15. The method of claim 14, further comprising:
  storing the first set of the audit files on a tape medium; and
  storing the second set of the audit files on a non-tape storage medium.

16. The method of claim 15, wherein the non-tape storage medium comprises a removable storage medium.

17. A computer system comprising:
  an operating system to generate audit tail data for a sequential audit trail;
  a queue to store file identifiers for a plurality of different audit files associated with the sequential audit trail; and
  an audit control module to receive the audit trail data from the operating system, select one or more file identifiers from the queue, store non-duplicate portions of the audit trail data within the audit files associated with the selected file identifiers, generate duplicate audit trail data from the stored audit trail data, and store the duplicate audit trail data within the same plurality of different audit files within which the stored audit trail data is stored.

18. The system of claim 17, wherein the operating system generates the audit trail data to include at least two audit blocks, and the audit control module writes the audit blocks to different audit files.

19. The system of claim 18, wherein the audit control module initiates a write of a first audit block to a first one of the audit files, and initiates a write of a second audit block to a second one of the audit files prior to completion of the write of the first block.

20. The system of claim 17, further comprising:
a first storage medium to store a first subset of the audit files; and
a second storage medium to store a second subset of the audit files.

21. The system of claim 17, further comprising:
a memory that temporarily holds the portions of audit trail data while being stored to the audit files; and
a recovery module to identify the portions of the audit trail data that were unsuccessfully stored within the audit files and that remain within the memory, and to direct the audit control module to store the identified portions of the audit trail data within the audit files.

22. The system of claim 17, wherein the audit blocks include trail block sequence numbers (TBSNs), the system further comprising a recovery module to identify a highest TBSN of a continuous sequence of TBSNs for the audit blocks stored within the audit files, and to direct the audit control nodule to synchronize the audit files based on the identified TBSN.

23. The system of claim 17, wherein the audit trail comprises one of a system audit trail, a transaction audit trail, and a step control audit trail.

24. A computer system comprising:
an operating system to generate audit trail data for a sequential audit trail; and
an audit control module to receive the audit trail data from the operating system and store non-duplicate portions of the audit trail data within different audit files associated with the audit trail,
wherein the audit blocks include trail block sequence numbers (TBSNs), the system further comprising a recovery module to identify a highest TBSN of a continuous sequence of TBSNs for the audit blocks stored within the audit files, and to direct the audit control module to synchronize the audit files based on the identified TBSN, and
wherein the recovery module directs the audit control module to remove any of the data blocks from the audit files that have TBSNs that exceed the identified TBSN.

25. The system of claim 24, wherein the audit control module generates a copy of the audit trail data, and writes the audit trail data to the audit files.

26. The system of claim 24, wherein the audit files comprise a first set of audit files, and the audit control module writes a copy of the audit trail data to a second set of audit files associated with the audit trail.

27. The system of claim 26 wherein the audit control module enforces a rule that the first set of audit files and the second set of audit files are stored on different respective storage media that reside at physically separate locations within an enterprise.

28. The system of claim 26, further comprising:
a first storage medium of a first type to store the first set of audit files; and
a second storage medium of a second type different from the first type to store the second set of audit files.

29. The system of claim 28, wherein the first storage medium comprises a tape storage medium, and the second storage medium comprises a non-tape storage medium.

30. The system of claim 29, wherein the non-tape storage medium comprises a removable storage medium.

31. A method comprising:
maintaining a queue of file identifiers for audit files associated with an audit trail;
receiving a request to store a first block of audit trail data;
selecting a first file identifier from the queue;
initiating a write to store the first block of audit trail data to the respective audit file for the first file identifier;
receiving a request to store a second block of audit trail data;
selecting a second file identifier from the queue;
initiating a write to store the second block of audit trail data to the respective audit file for the second file identifier prior to completion of the write of the first block;
generating copies of the first and second blocks of audit trail data; and
storing the copies within the same audit files within which the first and second blocks of audit trail data are stored.

32. A computing device comprising:
means for generating audit trail data for a sequential audit trail;
means for selecting one or more file identifiers from a queue of file identifiers for a plurality of different audit files associated with the sequential audit trail;
means for storing non-duplicate portions of the audit trail data within the audit files associated with the selected file identifiers;
means for generating copies of the stored audit trail data; and
means for storing the copies of the stored audit trail data within at least one of the audit files associated with the selected file identifiers.

33. The computing device of claim 32, wherein the generation means generates the audit trail data to include at least two audit blocks, and the audit control module writes the audit blocks to different audit files.

34. The computing device of claim 33, wherein the storage means initiates a write of a first audit block to a first one of the audit files, and initiates a write of a second audit block to a second one of the audit files prior to completion of the write of the first block.

35. The computing device of claim 33, wherein the storage means includes sequence information within the blocks to indicate a time-sequential order for the blocks.

36. The computing device of claim 35, wherein storing sequence information comprises storing with each block a block number that is unique to the file in which the block is stored, a timestamp, and a trail block sequence number (TBSN) that is unique to the audit trail.

37. The computing device of claim 33, wherein the storage means includes a file identifier within the first audit block to indicate which of the files stores the second audit block.

* * * * *